(No Model.)
E. E. KIRVEN.
ROOT CUTTER AND STUMP EXTRACTOR.
No. 520,363. Patented May 22, 1894.
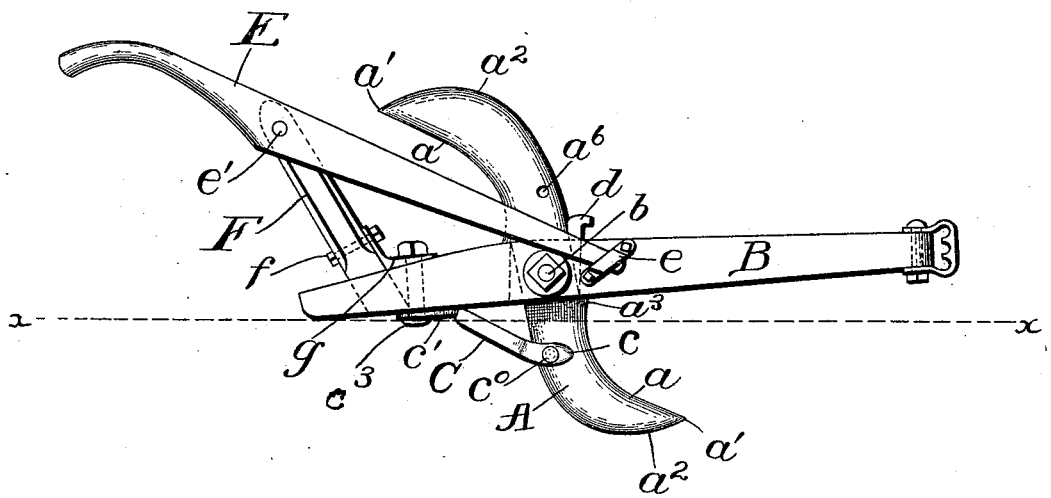
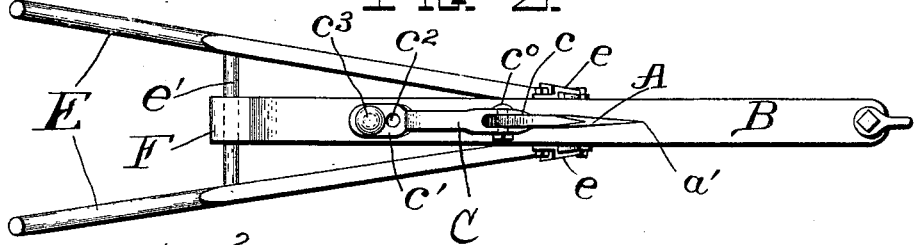
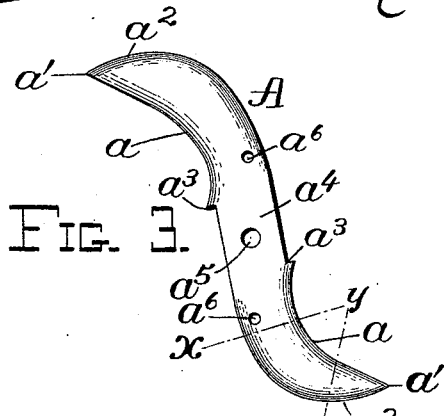
Witnesses
Percy C. Bowen
John C. Wilson
Inventor
E. E. Kirven,
By Whitman & Wilkinson,
Attorneys.
THE NATIONAL LITHOGRAPHING COMPANY,
WASHINGTON, D. C.

UNITED STATES PATENT OFFICE.

ERASMUS E. KIRVEN, OF DARLINGTON, SOUTH CAROLINA.

ROOT-CUTTER AND STUMP-EXTRACTOR.

SPECIFICATION forming part of Letters Patent No. 520,363, dated May 22, 1894.

Application filed January 30, 1894. Serial No. 498,481. (No model.)

*To all whom it may concern:*

Be it known that I, ERASMUS EUGENE KIRVEN, a citizen of the United States, residing at Darlington, in the county of Darlington and State of South Carolina, have invented certain new and useful Improvements in Root-Cutters and Stump-Extractors; and I do hereby declare the following to be a full, clear, and exact description of the invention, such as will enable others skilled in the art to which it appertains to make and use the same.

My invention relates to improvements in implements for clearing new ground which has been covered by woods or shrubbery, and it is especially adapted for use in land covered by young timber, willows, and the like.

Reference is had to the accompanying drawings, in which the same parts are indicated by the same letters throughout the several views.

Figure 1 represents a side elevation of the improved implement. Fig. 2 represents an inverted plan view of the same. Fig. 3 represents a view of the double curved cutting blade detached. Fig. 4 represents a section of the blade along the line $x\,y$ of Fig. 3, and Fig. 5 represents a section of the blade along the line $y\,z$ of Fig. 3.

A represents the blade which is made reversible, and is provided with two curved cutting edges $a$, having a curvature of approximately that shown. The back of the blade is sharpened as at $a^2$, which is thus arranged to cut downward, and the blade is made reversible, having two arms of unequal length, the one represented by the lower and shorter arm in Figs. 1 and 3 being intended for lighter and more superficial work than the longer and upper arm.

The double blade is provided with shoulders $a^3$ contiguous to the rectangular portion $a^4$, which passes through the beam B and the said rectangular portion is provided with the pin holes $a^5$ for the holding pin $b$. At equal distances from the said pin hole $a^5$, pin holes $a^6$ are provided to receive the pin $c^0$, securing the said blade to the brace C. This brace C has two rounded arms $c$ that pass on either side of the blade, and terminates at its rear in a flattened portion $c'$, provided with two or more pin holes $c^2$, through one of which passes the pin $c^3$. By having two or more of these holes, the angle of the blade may be adjusted with relation to the ground line represented by $x\,x$ in Fig. 1. The blade is further steadied in the beam B by the wedge $d$.

The handles E are secured to the beam by the staples $e$, round $e'$, and upright F, which latter is secured by means of the angle irons $g$ and bolt $f$ to the beam B.

The operation of the device is as follows:—
The implement being arranged with the short arm downward as in Fig. 1, a series of furrows are run at some little distance from the tree or stump to be extracted. In this way the roots are cut before they become very large. Now, if the return furrow be made closer to the tree, say one or two feet from the first furrow, the roots will be cut where they are somewhat larger, and then if cross furrows be run, the stump being gradually approached, the roots will be cut on all sides of the stump. Now if the handles E be turned over sufficiently to allow the point $a'$ to catch under the stump, the latter, if not too large, may be jerked out of the ground.

Since the tap root of all the stumps is generally killed some time before the field is cleared, and decays rapidly, if the lateral roots be all cut the stump may be extracted without very much difficulty; but if the stump be not too large, it is possible to so tilt the implement that it will project under and cut the tap root and at the same time jerk the stump out of the ground.

Where the trees are too large or the roots project too deep to be cut by the shorter arm of the blade, the blade is reversed and the longer arm used. Or the whole field may be cross furrowed with the shorter arm and then the longer arm used for cutting the tap roots and extracting the stumps.

It will be understood after inspection of Fig. 1, that the point $a$ as it is drawn through the ground will catch under most of the roots which will slide up along the curved cutting surface $a^3$ and thus a combined sawing and cutting effect is obtained. The shoulder $a^3$ will prevent the roots from wedging up against the bottom of the beam B. It will also be seen that should the point $a'$ cut into a root or enter a tangled mass of roots, or get between two roots, the blade would cut both upward and downward by means of the cutting surfaces $a$ and $a^2$.

The blade should be kept well sharpened, and an ordinary file used whenever necessary will be found efficient for this purpose.

It will be evident that in lieu of the double reversible blade, two single blades of different sizes might be substituted, and that various modifications would readily suggest themselves to any skilled mechanic, which could be used without departing from the spirit of my invention.

Having thus described my invention, what I claim, and desire to secure by Letters Patent of the United States, is—

1. In an implement of the character described, the combination with a beam and plow handles for directing the same, of a curved blade rigidly secured in said beam and having a point $a'$ between cutting edges curved upward as at $a$ and downward as at $a^2$, substantially as and for the purposes described.

2. In an implement of the character described, a double reversible blade A having two curved arms of unequal length, each arm pointed as at $a'$, and provided with cutting edges curved upward as at $a$ and downward as at $a^2$, on either side of said point, substantially as and for the purposes described.

In testimony whereof I affix my signature in presence of two witnesses.

ERASMUS E. KIRVEN.

Witnesses:
JNO. M. WADDILL,
JOHN C. WILSON.